(12) United States Patent
Watanabe et al.

(10) Patent No.: US 8,097,380 B2
(45) Date of Patent: Jan. 17, 2012

(54) FUEL CELL BODY, FUEL CELL UNIT, FUEL CELL STACK, AND FUEL CELL DEVICE INCLUDING EACH OF THEM

(75) Inventors: Naoki Watanabe, Kitakyushu (JP); Akira Kawakami, Kitakyushu (JP)

(73) Assignee: Toto Ltd. (JP)

( * ) Notice: Subject to any disclaimer, the term of this patent is extended or adjusted under 35 U.S.C. 154(b) by 1153 days.

(21) Appl. No.: 11/855,649

(22) Filed: Sep. 14, 2007

(65) Prior Publication Data

US 2009/0081516 A1  Mar. 26, 2009

(30) Foreign Application Priority Data

Sep. 15, 2006  (JP) ................. 2006-251530

(51) Int. Cl.
*H01M 8/10* (2006.01)
(52) U.S. Cl. ........ 429/466; 429/405; 429/452; 429/460; 429/467; 429/469; 429/479; 429/507; 429/508; 429/509; 429/510
(58) Field of Classification Search .......... 429/466, 429/405, 452, 460, 467, 469, 479, 507, 508, 429/509, 510
See application file for complete search history.

(56) References Cited

U.S. PATENT DOCUMENTS

| 2004/0247972 A1* | 12/2004 | Kendall et al. ................. 429/31 |
| 2005/0181253 A1* | 8/2005 | Finnerty et al. ................ 429/30 |

FOREIGN PATENT DOCUMENTS

| JP | 05101842 | 4/1993 |
| JP | 10189016 A | 7/1998 |
| JP | 2002289249 | 10/2002 |
| JP | 2002313374 A | 10/2002 |

\* cited by examiner

*Primary Examiner* — Ula C Ruddock
*Assistant Examiner* — Amanda Barrow
(74) *Attorney, Agent, or Firm* — Brooks Kushman P.C.

(57) ABSTRACT

A fuel cell unit (1) according to the present invention comprises a fuel cell (6) having an inner electrode layer (16), an outer electrode layer (20) and a through passage (15); and inner and outer electrode terminals (24, 26) fixed at the opposite ends (6a, 6b) of the fuel cell (6). The fuel cell (6) has an inner electrode peripheral surface (21) electrically communicating with the inner electrode layer (16) and an outer electrode peripheral surface (22) electrically communicating with the outer electrode layer (20). The inner and outer electrode terminals are respectively disposed so that they cover over the inner and outer electrode peripheral surfaces (21, 22) and they are electrically connected thereto. The inner and outer electrode terminals have respective connecting passages which are communicated with the through passage (15).

22 Claims, 8 Drawing Sheets

FUEL CELL BODY, FUEL CELL UNIT, FUEL CELL STACK, AND FUEL CELL DEVICE INCLUDING EACH OF THEM

FIELD OF THE INVENTION

The present invention relates to a fuel cell body, a fuel cell unit and a fuel cell stack used in a solid-oxide fuel cell (SOFC) and a fuel cell device including such a fuel cell body, a fuel cell unit and a fuel cell stack, and more specifically, relates to a fuel cell body, a fuel cell unit and a fuel cell stack having a tubular fuel cell and a fuel cell device including such a fuel cell body, a fuel cell unit and a fuel cell stack.

BACKGROUND OF THE INVENTION

Conventionally, a fuel cell stack having a tubular fuel cell has been known as described in, for example, paragraph 0028 and FIG. 4 in Japanese Patent Laid-open Publication No. 2002-289249 and FIGS. 1 and 6 in Japanese Patent Laid-open Publication No. 5-101842. Now, referring to FIG. 11, an example of a conventional fuel cell stack described in the Japanese Patent Laid-open Publication No. 2002-289249 will be explained. FIG. 11 is a schematically cross-sectional view of a conventional fuel cell stack.

As shown in FIG. 11, a fuel cell stack 200 described in the Japanese Patent Laid-open Publication No. 2002-289249 has a structure in which a plurality of cylindrical fuel cells 202 are arranged laterally relative to a longitudinal direction thereof, and opposite ends of the fuel cells 202 are supported by respective metallic plates 204. In this fuel cell stack 200, the fuel cells 202 are electrically connected to each other in parallel.

The fuel cell 202 has an inner electrode layer 204, an outer electrode layer 208, and an electrolyte layer 206 disposed therebetween. On one end of the fuel cell 202, a connecting member 210 inserted inside of the inner electrode layer 204 is provided. On the other end thereof, another connecting member 212 fitted to outside of the outer electrode layer 208 is provided. The inner and outer electrode layers 204, 208 and the connecting members 210, 212 are connected by means of brazing, flame spraying or press fitting. Further, the connecting members 210, 212 and the metallic plates 204 are connected by means of welding, crimping or press fitting.

Further, FIGS. 1 and 6 in Japanese Patent Laid-open Publication No. 5-101842 shows a hollow hexagonal fuel cell, at an end of which an inner electrode is longitudinally exposed.

In the fuel cell stack 200 disclosed in Japanese Patent Laid-open Publication No. 2002-289249, it is difficult to attach the connecting member 210 to the inner electrode 204, and contact resistance therebetween tends to become large. Especially, it is difficult to attach the connecting member 210 to the inner electrode 204 of the fuel cell 202 having an outer diameter within 1-10 mm.

A voltage which can be generated by a single fuel cell is constant regardless of a size thereof. Thus, to obtain a high voltage, it is required that fuel cells be electrically connected to each other in a series. On the other hand, to obtain a large current, for example, fuel cells are connected to each other in parallel. Since a number of fuel cells connected to each other in a series or in parallel varies depending on the use thereof, a need for easily assembling fuel cells in desired electrical connections. In a fuel cell device incorporating the fuel cell stack 200 disclosed in Japanese Patent Laid-open Publication No. 2002-289249, one of the two following steps is needed; one step of electrically assembling a plurality of fuel cells 202 in a series and then electrically connecting the assembled fuel cells 202 in parallel to form a fuel cell stack 200; and the other step of electrically assembling a plurality of fuel cells 202 in parallel to form a fuel cell stack 200 and then electrically assembling the fuel cell stacks in a series. This means that assembling an entire fuel cell device takes a lot of trouble.

It is therefore an object of the present invention is to provide a fuel cell body, a fuel cell unit, a fuel cell stack and a fuel cell device including one of them, in each of which electricity can be easily taken out from the inner electrode layer, and fuel cells can be easily assembled with each other and connected to each other in electrically parallel and/or in a electrical series.

SUMMARY OF THE INVENTION

In order to achieve the above-stated object, a fuel cell unit according to the present invention incorporated in a fuel cell device comprises a tubular fuel cell body having a tubular inner electrode layer, a tubular outer electrode layer, a tubular electrolyte layer disposed between the inner and outer electrode layers, and a through passage defined inside of the inner electrode layer; an inner electrode terminal fixed at one end of the fuel cell body for taking out electricity from the inner electrode layer; and an outer electrode terminal fixed at the other end of the fuel cell body for taking out electricity from the outer electrode layer; wherein the fuel cell body has, at the one end thereof, an inner electrode exposed periphery where the inner electrode layer is exposed out of the electrolyte layer and the outer electrode layer; wherein the fuel cell body has, on a peripheral surface at the one end thereof, an inner electrode peripheral surface electrically communicating with the inner electrode layer via the inner electrode exposed periphery, and, on a peripheral surface at the other end thereof, an outer electrode peripheral surface electrically communicating with the outer electrode layer; wherein the inner electrode terminal is disposed so that it covers over the entire circumference of the inner electrode peripheral surface from the outside thereof and it is electrically connected thereto, and the outer electrode terminal is disposed so that it covers the entire circumference of the outer electrode peripheral surface from the outside thereof and it is electrically connected thereto; and wherein the inner electrode terminal and the outer electrode terminal have respective connecting passages which are communicated with the through passage and the exterior of the fuel cell body.

In this fuel cell unit, since electricity at the inner electrode layer is taken out through the inner electrode terminal via the inner electrode peripheral surface which is the outer surface of the fuel cell body, it is easier to take out electricity from the inner electrode layer than the conventional fuel cell device. Further, since the fuel cell body together with the inner electrode terminal and the outer electrode terminal 26 disposed on the respective opposite sides thereof defines a single unit, fuel cells can be easily assembled in a free combination of series and/or parallel electrical connections thereof.

In an embodiment of the fuel cell unit according to the present invention, preferably, the inner electrode terminal and the fuel cell body are sealingly fixed to each other with a conductive sealer extending over the entire circumferences thereof, and the outer electrode terminal and the fuel cell are sealingly fixed to each other with a conductive sealer extending over the entire circumferences thereof.

In this fuel cell unit, the conductive sealer itself already has a function of dividing gas acting on the inner electrode layer from gas acting on the outer electrode layer and a function of taking out electricity from the inner electrode layer and the outer electrode layer. Further, since the conductive sealer has good sealing adhesion relative to the inner electrode peripheral surface, contact resistance at an interface of the sealer can be reduced so that a fuel cell unit having a good performance of electric power generation and good reliability can be provided. Thus, a fuel cell device can be easily assembled without concern for takeoff of electricity from the inner electrode layer, gas sealing and so on.

In an embodiment of the fuel cell unit according to the present invention, preferably, the inner electrode terminal and the outer electrode terminal have respective tubular portions which extend in a longitudinal direction of the fuel cell body away therefrom and include the respective connecting passages; and cross-sectional outer profiles of the tubular portions of the inner electrode terminal and the outer electrode terminal are identical to each other.

In this embodiment, connecting manners with the inner electrode terminal and the outer electrode terminal can be standardized so that assembling a fuel cell device become easier.

In an embodiment of the fuel cell unit according to the present invention, the fuel cell body may be defined by one fuel cell or a plurality of fuel cells longitudinally coupled to each other and electrically connected to each other in a series.

Further, in an embodiment of the fuel cell unit, the inner electrode peripheral surface may be defined by the inner electrode exposed periphery or an inner electrode collecting layer disposed outside thereof. Further, the outer electrode peripheral surface may be defined by the outer electrode layer or the outer electrode collecting layer disposed outside thereof.

Further, in order to achieve the above-stated object, a fuel cell device according to the present invention comprises the above-stated fuel cell unit.

Further, in order to achieve the above-stated object, a fuel cell stack according to the present invention comprises a plurality of the above-stated fuel cell units having the above-stated respective tubular portions and arranged laterally relative to the longitudinal direction; and support plates which have respective apertures fitted to the tubular portions of the plurality of the fuel cell units and which are positioned at the respective opposed ends thereof.

In this fuel cell stack, since the tubular portions are fitted into the apertures, a plurality of fuel cells can be easily assembled with the support plates, as well as an integral fuel cell stack can be easily made.

Further, in order to achieve the above-stated object, a fuel cell stack according to the present invention comprises a plurality of the above-stated fuel cell units having the above-stated tubular portions and arranged laterally relative to the longitudinal direction; and a coupling member fitted to the tubular portions of the at least two adjacent fuel cell units and coupling them to each other; wherein the coupling member has a connecting passage connecting the connecting passages in the tubular portions of the adjacent fuel cell units to each other.

In this fuel cell stack, the fuel cell device can be easily extended laterally regardless of the electrical series and/or parallel connections of the fuel cells.

Further, in order to achieve the above-stated object, a fuel cell device according to the present invention comprises the above-stated fuel cell stack.

Further, in order to achieve the above-stated object, a fuel cell body according to the present invention incorporated in a fuel cell device comprises at least two tubular fuel cells arranged in a longitudinal direction thereof; and a coupling electrode terminal disposed between the fuel cells and fixed thereto; wherein each of the fuel cells has a tubular inner electrode layer, a tubular outer electrode layer, a tubular electrolyte layer disposed between the inner and outer electrode layers, and a through passage defined inside of the inner electrode layer; wherein each of the fuel cells has, at the one end thereof, an inner electrode exposed periphery where the inner electrode layer is exposed out of the electrolyte layer and the outer electrode layer; wherein each of the fuel cells has, on a peripheral surface at the one end thereof, an inner electrode peripheral surface electrically communicating with the inner electrode layer via the inner electrode exposed periphery, and, on a peripheral surface at the other end thereof, an outer electrode peripheral surface electrically communicating with the outer electrode layer; wherein the coupling electrode terminal is disposed so that it covers over the entire circumference of the inner electrode peripheral surface of one of the fuel cells from the outside thereof and it is electrically connected thereto, and is disposed so that it covers the entire circumference of the outer electrode peripheral surface of the other fuel cell from the outside thereof and it is electrically connected thereto, in order to electrically connect the inner electrode peripheral surface of the one fuel cell to the outer electrode peripheral surface of the other fuel cell; and wherein the coupling electrode terminal has a connecting passage for communicating the through passage of the one fuel cell with the through passage of the other fuel cell.

In this fuel cell body, similar to the above-stated fuel cell unit, due to the coupling electrode terminal in the fuel cell body, the fuel cells can be easily assembled with each other in the longitudinal direction and electrically connected to each other in a series.

Further, in order to achieve the above-stated object, a fuel cell body according to the present invention incorporated in a fuel cell device comprises at least two tubular fuel cells arranged laterally relative to a longitudinal direction thereof adjacent to each other; and a coupling electrode terminal coupling the tubular fuel cells to each other; wherein each of the tubular fuel cells has a tubular inner electrode layer, a tubular outer electrode layer, a tubular electrolyte layer disposed between the inner and outer electrode layers, and a through passage defined inside of the inner electrode layer; wherein each of the fuel cells has, at the one end thereof, an inner electrode exposed periphery where the inner electrode layer is exposed out of the electrolyte layer and the outer electrode layer; wherein each of the fuel cells has, on a peripheral surface at the one end thereof, an inner electrode peripheral surface electrically communicating with the inner electrode layer via the inner electrode exposed periphery, and, on a peripheral surface at the other end thereof, an outer electrode peripheral surface electrically communicating with the outer electrode layer; wherein the coupling electrode terminal is disposed so that it covers over the entire circumference of the inner electrode peripheral surface of at least one of the fuel cells from the outside thereof and it is electrically connected thereto, and is disposed so that it covers the entire circumference of the outer electrode peripheral surface of the other fuel cell from the outside thereof and it is electrically connected thereto, in order to electrically connect the inner electrode peripheral surface of the at least one fuel cell to the outer electrode peripheral surface of the other fuel cell, and wherein the coupling electrode terminal has a connecting passage for communicating the through passage of the at least one fuel cell with the through passage of the other fuel cell.

In this fuel cell body, similar to the above-stated fuel cell unit, due to the coupling electrode terminal in the fuel cell body, the fuel cells can be easily assembled with each other laterally and electrically connected to each other in parallel and/or in a series.

In an embodiment of the above-stated two fuel cell bodies according to the present invention, preferably, the coupling electrode terminal and the fuel cells connected to each other via the coupling electrode terminal are sealingly fixed to each other over the circumferences of the fuel cell with a conductive sealer.

In this fuel cell body, the conductive sealer has a function of dividing gas acting on the inner electrode layer from gas acting on the outer electrode layer, and a function of taking out electricity from the inner and outer electrode layers. Further, since the conductive sealer has a good sealing adhesion relative to the inner electrode peripheral surface, contact resistance at an interface of the sealer can be reduced so that a fuel cell body having a good performance of electric power generation and good reliability can be provided. Thus, the fuel cell device can be easily assembled.

Further, in order to achieve the above-stated object, a fuel cell device according to the present invention comprises the above-stated fuel cell body.

As explained above, according to the fuel cell body, the fuel cell unit, the fuel cell stack and the fuel cell device including such a fuel cell body, the fuel cell unit and the fuel cell stack according to the present invention, electricity can be easily taken out from the inner electrode layer, and fuel cells can be easily assembled with each other.

DETAILED DESCRIPTION OF THE PREFERRED EMBODIMENTS

Now, referring to Figures, embodiments of the present invention will be explained in detail.

Figure 1:
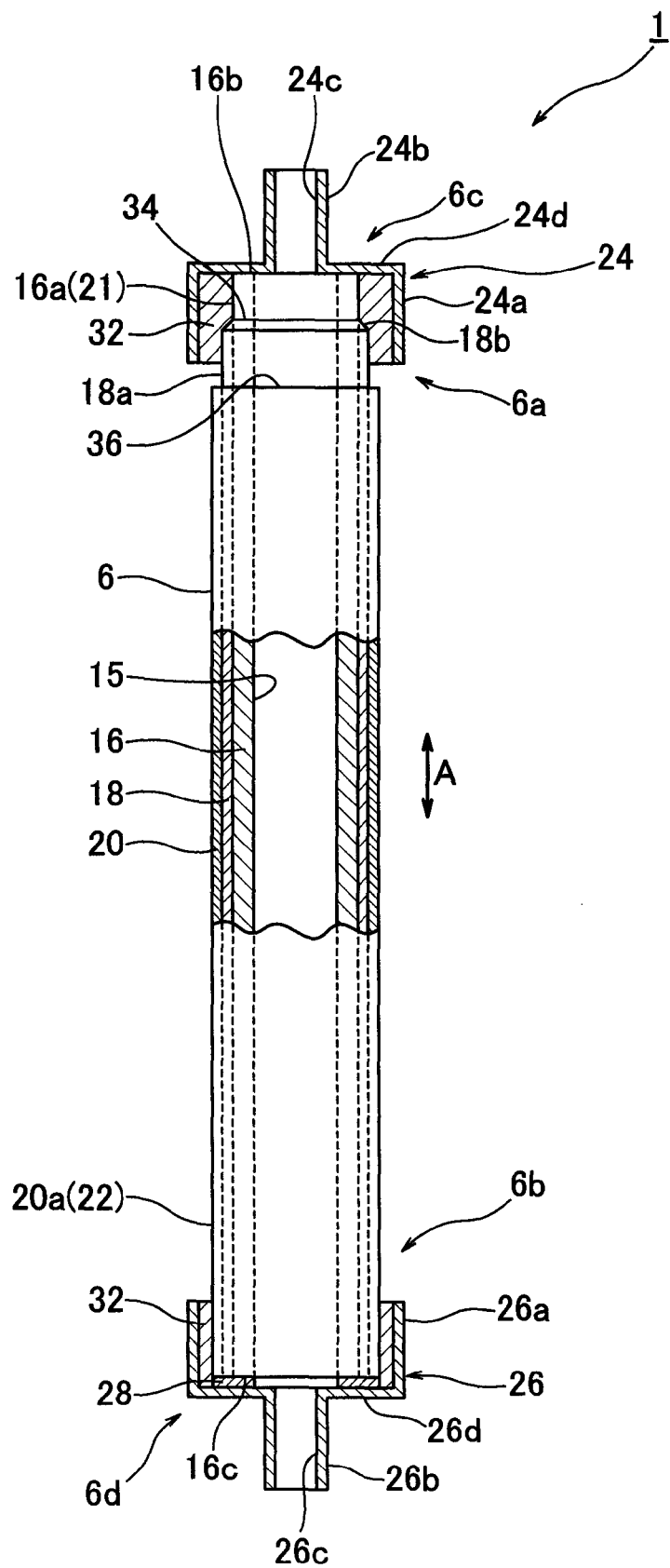
FIG. 1 is a cross-sectional view of a fuel cell unit according to a first embodiment of the present invention.

First, referring to FIG. 1, a first embodiment of a fuel cell unit according to the present invention will be explained. FIG. 1 is a cross-sectional view of a fuel cell unit according to the present invention.

As shown in FIG. 1, a fuel cell unit 1 according to the present invention has one tubular fuel cell body. In this embodiment, the fuel cell body is defined by one fuel cell 6, which fuel cell 6 is cylindrical.

The fuel cell 6 has a cylindrical inner electrode layer 16, a cylindrical outer electrode layer 20, a cylindrical electrolyte layer 18 disposed between these electrode layers 16, 20, and a through flow passage 15 defined inside of the inner electrode layer 16. The fuel cell 6 has, at one end 6a thereof, an inner electrode exposed periphery 16a where the inner electrode layer 16 is exposed out of the electrolyte layer 18 and the outer electrode layer 20, and an electrolyte exposed periphery 18a where the electrolyte layer 18 is exposed out of the outer electrode layer 20, the inner electrode exposed periphery 16a and the electrolyte exposed periphery 18a defining portions of an outer peripheral surface of the fuel cell 6. The remaining portion of the outer peripheral surface of the fuel cell 6 including the other end 6b thereof is defined by an outer electrode exposed periphery 20a where the outer electrode layer 20 is exposed. In this embodiment, the inner electrode exposed periphery 16a also defines an inner electrode peripheral surface 21 electrically communicating with the inner electrode layer 16, and the outer electrode exposed periphery 20a defines an outer electrode peripheral surface 22 electrically communicating with the outer electrode layer 20.

The inner electrode layer 16 is made of, for example, at least one of a mixture of Ni and zirconia doped with at least one of Ca and rare-earth elements such as Y and Sc; a mixture of Ni and ceria doped with at least one of rare-earth elements; and a mixture Ni and lanthanum-gallate doped with at least one of Sr, Mg, Co, Fe and Cu. The electrolyte layer 18 is made of, for example, at least one of zirconia doped with at least one of rare-earth elements such as Y and Sc; ceria doped with at least one of rare-earth elements; and lanthanum-gallate doped with at least one of Sr and Mg. The outer electrode layer 20 is made of, for example, at least one of lanthanum-manganite doped with at least one of Sr and Ca; lanthanum-ferrite doped with at least one of Sr, Co, Ni and Cu; samarium-cobalt doped with at least one of Sr, Fe, Ni and Cu; and silver. In this case, the inner electrode layer 16 is a fuel electrode, while the outer electrode layer 20 is an air electrode. A thickness of the inner electrode layer 16 is, for example, 1 mm, that of the electrolyte layer 18 is, for example, 30 µm, and that of the outer electrode layer 20 is, for example, 30 µm.

The fuel cell unit 1 further has an inner electrode terminal 24 fixed to the one end 6a of the fuel cell 6 for taking out electricity from the inner electrode layer 16, and an outer electrode terminal 26 fixed to the other end 6b of the fuel cell 6 for taking out electricity from the outer electrode layer 20.

The inner electrode terminal 24 has a body portion 24a disposed to cover the entire circumference of the inner electrode peripheral surface 21 from the outside thereof and electrically connected thereto, and a tubular portion 24b extending away from the fuel cell 6 in a longitudinal direction A thereof. Preferably, the body portion 24a and the tubular portion 24b are cylindrical and are disposed coaxially, and a diameter of the tubular portion 24b is smaller than that of the body portion 24a. The body portion 24a and the tubular portion 24b have a connecting passage 24c communicating with the through passage 15 and the exterior of the fuel cell unit 1. A step 24d between the body portion 24a and the tubular portion 24b abuts to an end surface 16b of the inner electrode layer 16.

The outer electrode terminal 26 has a body portion 26a disposed to cover the entire circumference of the outer electrode peripheral surface 22 from outside thereof and electrically connected thereto, and a tubular portion 26b extending away from the fuel cell 6 in a longitudinal direction thereof. Preferably, the body portion 26a and the tubular portion 26b are cylindrical and are disposed coaxially, and a diameter of the tubular portion 26b is smaller than that of the body portion

26a. The body portion 26a and the tubular portion 26b have a connecting passage 26c communicating with the through passage 15 and the exterior of the fuel cell unit 1. A step 26d between the body portion 26a and the tubular portion 26b abuts to end surfaces 16c of the outer electrode layer 20, the electrolyte layer 18 and the inner electrode layer 16 via an annular insulating member 28.

Cross-sectional outer profiles of the tubular portions 24b, 26b of the inner electrode terminal 24 and the outer electrode terminal 26 has the same shape as each other. More preferably, entire shapes of the inner electrode terminal 24 and the outer electrode terminal 26 are the same as each other.

The inner electrode terminal 24 and the fuel cell 6 are sealingly fixed to each other over the entire circumferences thereof with a conductive sealer 32, as well as the outer electrode terminal 26 and the fuel cell 6 are also sealingly fixed to each other over the entire circumferences thereof with a conductive sealer 32.

At the one end 6a, the inner electrode exposed periphery 16a and the electrolyte exposed periphery 18a extend over the entire circumference of the fuel cell 6 and are adjacent to each other in the longitudinal direction A. Further, the inner electrode exposed periphery 16a is located at a tip 6c of the fuel cell 6. A boundary 34 between the inner electrode exposed periphery 16a and the electrolyte exposed periphery 18a is located inside of the body portion 24a of the inner electrode terminal 24, while a boundary 36 between the electrolyte exposed periphery 18a and the outer electrode exposed periphery 20a is located outside of the body portion 24a. Further, the electrolyte exposed periphery 18a has a taper portion 18b which becomes thin toward the inner electrode exposed periphery 16a.

At the one end 6a, the sealer 32 extends from the inner electrode exposed periphery 16a to the electrode exposed periphery 18a over the entire circumference thereof, filled into the body portion 24a of the inner electrode terminal 24, and is spaced from the outer electrode layer 20 via the electrolyte exposed periphery 18a. Further, at the other end 6b, the sealer 32 extends over the circumference of the outer electrode exposed periphery 20a, and filled into a space between the body portion 26a of the outer electrode terminal 26 and the insulating member 28. The sealer 32 is disposed to divide a region for gas acting on the inner electrode layer 16, i.e., the through passage 15 and the connecting passages 24c, 26c, from a region for gas acting on the outer electrode layer 20. The sealer 32 is, for example, silver, a mixture of silver and glass, or wax including silver, gold, nickel, copper, or titan.

Next, an operation of the fuel cell unit according to the present invention will be explained.

Gas (fuel gas) acting on the inner electrode layer 16 is passed through the through passage 15 and the connecting passages 24c, 26c. Further, gas (air) acting on the outer electrode layer 20 is flown around the outer electrode layer 20. Thus, the fuel cell unit 1 is activated. Electricity at the inner electrode 16 can be taken out via the sealer 32 and the inner electrode terminal 24, while electricity at the outer electrode 20 can be taken out via the sealer 32 and the outer electrode terminal 26.

Next, an example of a way of manufacturing a fuel cell unit according to the present invention will be explained.

First, a tubular fuel cell is formed. Specifically, the tubular inner electrode layer 16 is formed, then, the electrolyte layer 18 is formed around the inner electrode layer 16 so that the end of the inner electrode layer 16 is exposed, and then the outer electrode layer 20 is formed around the electrolyte layer 18 so that the end of the electrolyte layer 18 is exposed. After that, the taper portion 18b may be formed at the end of the electrolyte layer 18.

Next, the inner electrode terminal 24 is capped over the one end 6a of the fuel cell 6, and then the inner electrode terminal 24 and the one end 6a of the fuel cell 6 are sealingly fixed to each other with the sealer 32. Further, the outer electrode terminal 26 is capped over the other end 6b of the fuel cell 6 via the insulating member 28, and then the outer electrode terminal 26 and the other end 6b of the fuel cell 6 are sealingly fixed to each other with the sealer 32. Thus, the fuel cell unit 1 can be made.

In the fuel cell unit 1, since electricity at the inner electrode 16 is taken out from the inner electrode terminal 16 through the inner electrode peripheral surface 21 defining the outer peripheral surface of the fuel cell 6, electricity at the inner electrode layer 16 can be taken out more easily than the prior-art fuel cell. Further, since a contact area between the sealer 32 and the inner electrode peripheral surface 16a can become larger without obstructing flow of gas acting on the inner electrode 15, contact resistance therebetween can be reduced. Especially, it is advantageous to use a fuel cell 6 having an outer diameter within 1-10 mm.

Further, since the fuel cell 6 with the inner electrode terminal 24 and the outer electrode terminal 26 disposed on the respective opposite sides thereof defines one unit, the fuel cells 6 can be easily assembled in a free combination of series and/or parallel electrical connections thereof.

Further, in the fuel cell unit 1, since the cross-sectional outer profiles of the tubular portions 24b, 26b of the inner electrode terminal 24 and the outer electrode terminal 26 are the same as each other, connecting manners with the inner electrode terminal 24 and the outer electrode terminal 26 can be standardized so that assembling a fuel cell device become easier. Further, in the fuel cell unit 1, since the entire shapes of the inner electrode terminal 24 and the outer electrode terminal 26 are the same as each other, the inner electrode terminal 24 and the outer electrode terminal 26 can be defined by a common part so that the number of kinds of parts required for making the fuel cell unit 1 can be reduced.

Further, the fuel cell unit 1 itself, due to the conductive sealer 32, already has a function of dividing gas acting on the inner electrode layer 16 from gas acting on the outer electrode layer 20 and a function of taking out electricity from the inner electrode layer 16 and the outer electrode layer 20. Further, since the sealer 32 has good sealing adhesion relative to the inner electrode peripheral surface 21, contact resistance at an interface of the sealer 32 in the fuel cell unit 1 can be reduced so that a fuel cell unit 1 having a good performance of electric power generation and good reliability can be provided. Thus, a fuel cell device can be easily assembled without concern for takeoff of electricity from the inner electrode layer 16, gas sealing and so on.

Since the inner electrode exposed periphery 16a and the sealer 32 is employed, the manufacturing process of a fuel cell stack 4 and the fuel cell unit 1 becomes easy. Specially, it is advantageous to use the fuel cell 6 having an outer diameter within 1-10 mm.

Further, when the sealer 32 is disposed or filled between the inner electrode terminal 24 and the fuel cell 6, the taper portion 18b of the electrolyte layer 18 can prevent degradation of gas-sealing performance of the sealer 32 due to bubbles and so on remaining between the inner electrode exposed periphery 16a and the electrolyte exposed periphery 18a. This improves a yield ratio and easily allows a stable manufacturing process.

Next, referring to FIGS. 2-4, variants of the other end 6b of the fuel cell 6 will be explained.

Figure 2:
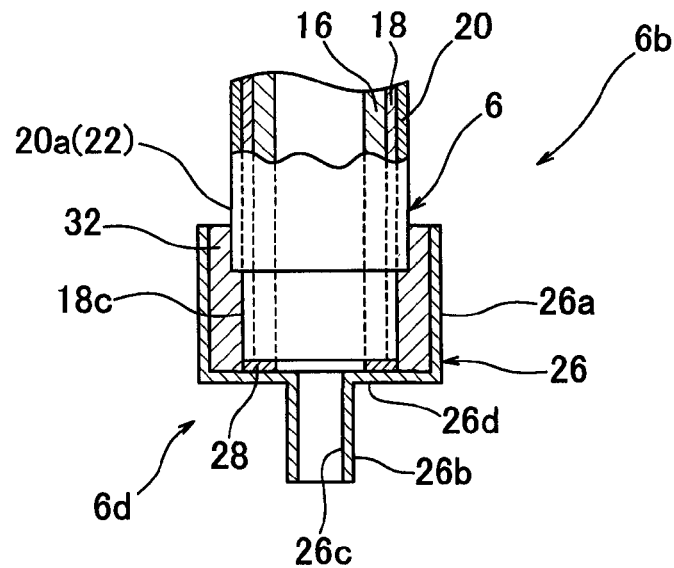
FIG. 2 is a cross-sectional view of a first variant of the other end of a fuel cell.

FIG. 2 is a cross-sectional view of a first variant of the other end of the fuel cell. As shown in FIG. 2, at the other end 6b of the fuel cell 6, the electrolyte layer 18 may be exposed to the outer peripheral surface of the fuel cell 6 to form a second electrolyte exposed periphery 18c so that the other end of the outer electrode layer 20 is located away from the end surface of the inner electrode layer 16. This reliably prevents a short circuit between the inner electrode layer 16 and the outer electrode layer 20 via the sealer 32.

Figure 3:
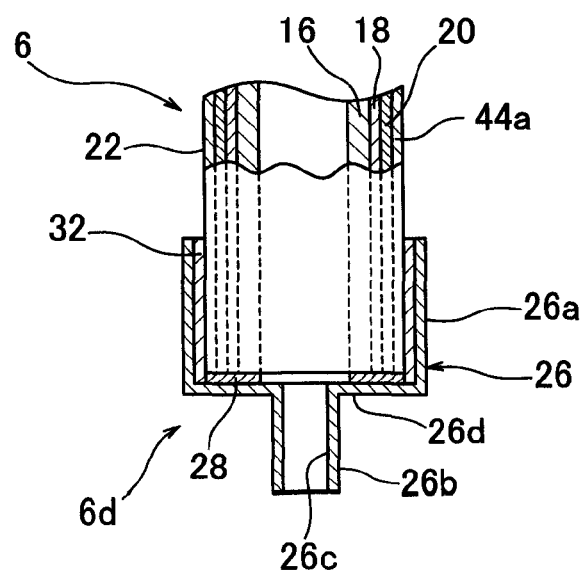
FIG. 3 is a cross-sectional view of a second variant of the other end of the fuel cell.

FIG. 3 is a cross-sectional view of a second variant of the other end of the fuel cell. As shown in FIG. 3, an outer electrode collecting layer 44a may be disposed entirely or partially around the outer electrode 20 of the fuel cell 6. In this variant, the outer electrode peripheral surface 22 electrically connected to the outer electrode 20 is defined by the outer electrode collecting layer 44a. The outer electrode collecting layer 44a is, for example, a porous conductive film containing silver. A thickness of the outer electrode collecting layer 44a is, for example, 10 μm. Further, the outer electrode collecting layer 44a may be formed of wire or mesh of silver or heat-resistant metal. The outer electrode collecting layer 44a serves as an electrical passage when the outer electrode layer 20 is thin so that it does not tend to conduct electricity.

Figure 4:
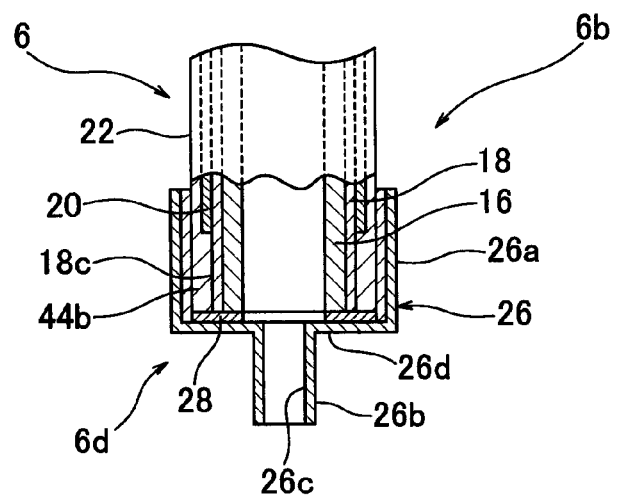
FIG. 4 is a cross-sectional view of a third variant of the other end of the fuel cell.

FIG. 4 is a cross-sectional view of a third variant of the other end of the fuel cell. As shown in FIG. 4, at a tip 6d of the other end 6b of the fuel cell 6, the electrolyte layer 18 may be exposed to the outer peripheral surface of the fuel cell 6 to form a second electrolyte exposed periphery 18c, and then an outer electrode collecting layer 44b may be disposed entirely or partially around the outer electrode 20 and the second electrolyte exposed periphery 18c. In this variant, the outer electrode peripheral surface 22 electrically connected to the outer electrode 20 is defined by the outer electrode collecting layer 44b. A material, a thickness and so on of the outer electrode collecting layer 44b are the same as those of the outer electrode collecting layer 44a of the above-stated second variant. Since the outer electrode collecting layer 44b reduces possible exposure of the outer electrode layer 20 to gas acting on the inner electrode layer 16, electrical connection of the outer electrode layer 20 become more reliable.

Figure 5:
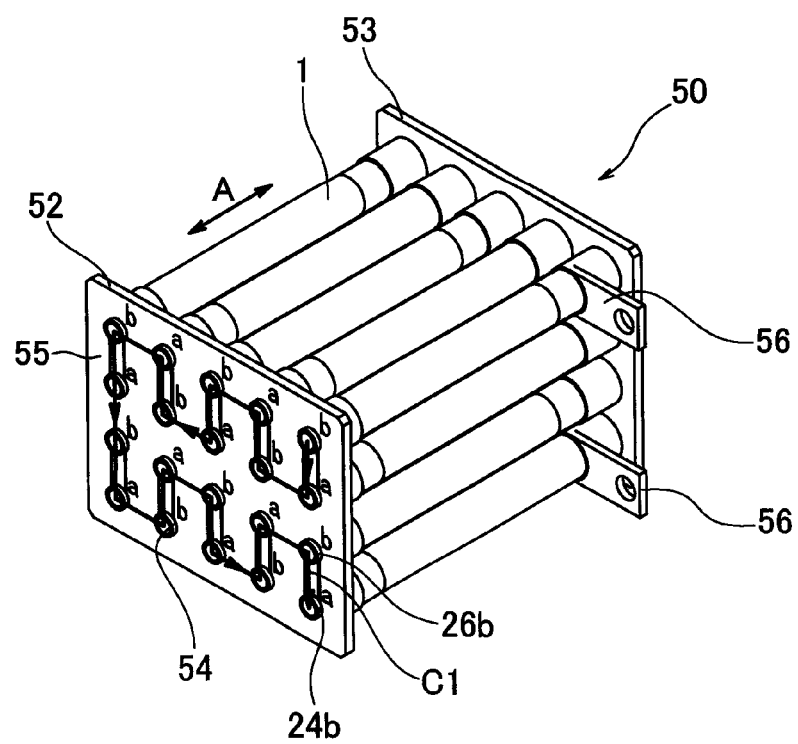
FIG. 5 is a perspective view of a fuel cell stack according to a first embodiment of the present invention.
Figure 6:
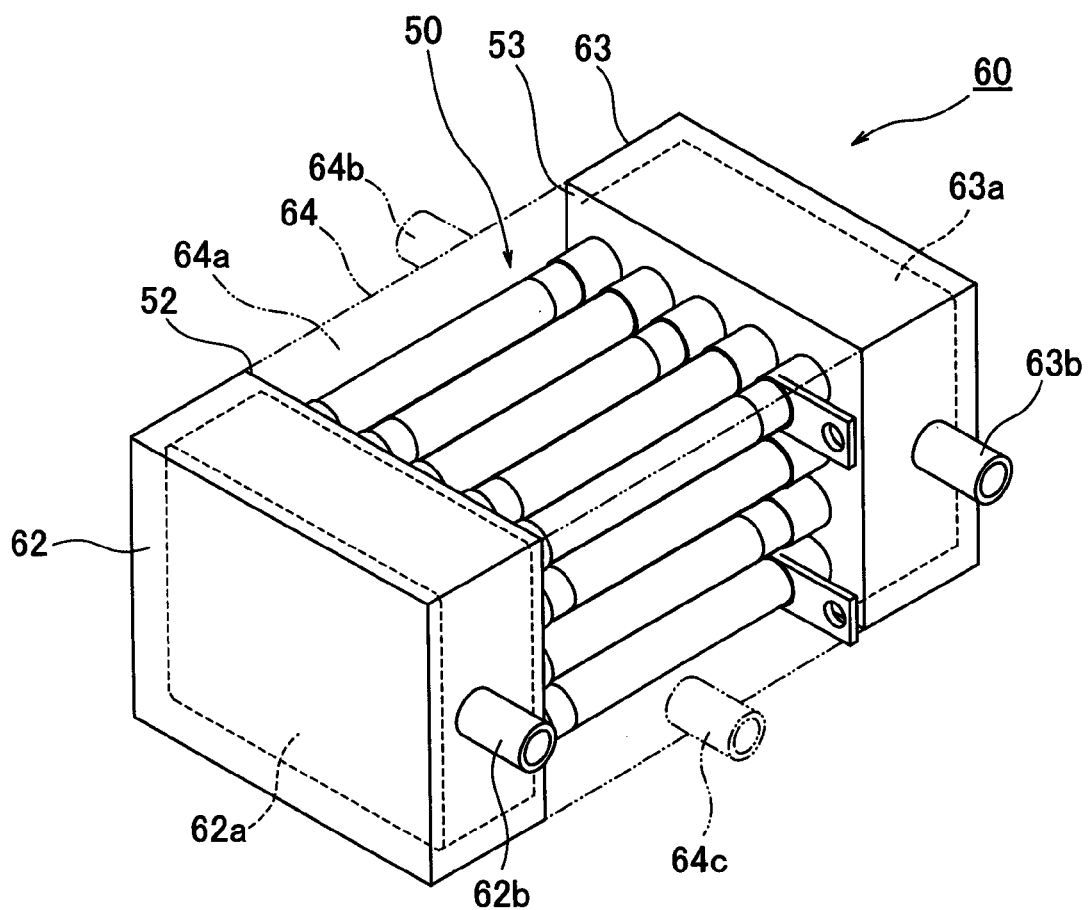
FIG. 6 is a perspective view of a fuel cell device according to a first embodiment of the present invention.

Next, referring to FIGS. 5 and 6, first embodiments of a fuel cell stack and a fuel cell device according to the present invention including the above-stated fuel cell units will be explained. FIG. 5 is a perspective view of a fuel cell stack according to the first embodiment of the present invention. FIG. 6 is a perspective view of a fuel cell device according to the first embodiment of the present invention.

As shown in FIG. 5, a fuel cell stack 50 which is the first embodiment of the fuel cell stack according to the present invention has a plurality of fuel cell units 1 arranged laterally relative to the longitudinal direction A, and support plates 52, 53 positioned at the respective opposite ends of the fuel cell units 1. Each of the support plates 52, 53 has apertures 54 to which the tubular portions 24b, 26b of the fuel cell units 1 are fitted. In this embodiment, the support plates 52, 53 are made of electrically insulating material, for example, heat-resistant ceramics. Specifically, alumina, zirconia, spinel, forsterite, magnesia, or titania are preferably employed for such ceramics. The material of the support plates 52, 53 is more preferably a material which has a coefficient of thermal expansion close to that of thermal expansion of components defining the fuel cell stack 50.

As shown by arrows C1 in FIG. 5, in the fuel cell stack 50, all twenty fuel cells 6 arranged in 5 rows×4 rows are electrically connected to each other in a series by connecting members 55. References "a" and "b" shown in FIG. 5 are for indicating directions of the fuel cells 6; concretely, the reference "a" indicates the one end 6a while the reference "b" indicates the other end 6b. Further, at the terminals of the fuel cells 6 electrically connected to each other in a series, external terminals 56 for connecting the fuel cell 6 and the exterior thereof is provided. The connecting members 55 are made of heat-resistant metal such as stainless steel, nickel base alloy and chrome base alloy, or conductive ceramic material such as lanthanum chromite. In view of the simplification of manufacturing processes and cost reduction, the connecting members 55 are preferably conductive films which are pre-formed on the support plates 52, 53 and made of, for example, silver, nickel, or copper with a thickness within 1-500 μm.

As shown in FIG. 6, a fuel cell device 60, which is the first embodiment of the fuel cell device according to the present invention, has the above-stated fuel cell stack 50, end cases 62, 63 sealingly connected to the support plates 52, 53 so as to form, on the opposite sides of the fuel cell stack 50, chambers 62a, 63a through which gas acting on the inner electrode layer 16 flows, and a central case 64 sealingly connected to the support plates 52, 53 so as to form a chamber 64a which encloses the plurality of fuel cell units 1 and through which gas acting on the outer electrode layer 20 flows. The end cases 62, 63 have respectively an input port 62b and an output port 63b, while the central case 64 has an input port 64b and an output port 64c. The external terminals 56 extends through the central case 64 via an insulating member (not shown).

Next, an operation of the above-stated fuel cell device will be explained.

Gas acting on the inner electrode layer 16 (fuel gas) is supplied to the input port 62b, passed through the chamber 62a, the through passage 15 and the connecting passages 24c, 26c of the fuel cell units 1 and the chamber 63a, and discharged through the output port 63b. Further, gas acting on the outer electrode layer 20 (air) is supplied to the input port 64b, passed through the chamber 64a to flow around the outer electrode layer 20, and discharged through the output port 64c. Thus, the fuel cell device 60 is activated. Further, electricity of the inner electrode 16 is taken out via the sealer 32 and the inner electrode terminal 24, while electricity of the outer electrode 20 is taken out via the sealer 32 and the outer electrode terminal 26, and then the above-stated electricity is taken out through the external terminals 56.

In the fuel cell stack 50, since the tubular portions 24c, 26c are fitted into the apertures 54, a plurality of fuel cells 6 can be easily assembled with the support plates 52, 53, as well as an integral fuel cell stack 50 can be easily made.

Figure 7:
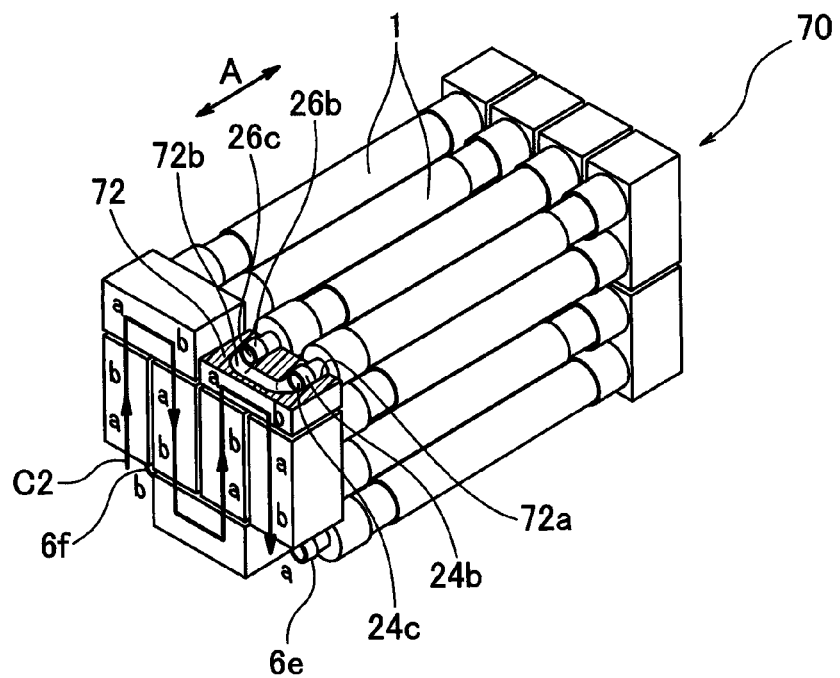
FIG. 7 is a perspective view of a fuel cell stack according to a second embodiment of the present invention.
Figure 8:
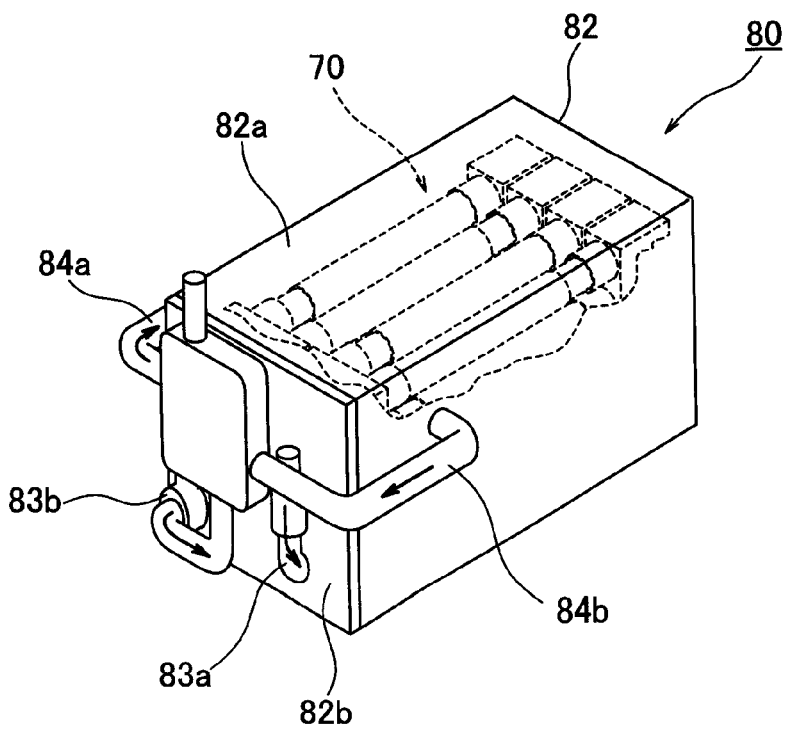
FIG. 8 is a perspective view of a fuel cell device according to a second embodiment of the present invention.

Next, referring to FIGS. 7 and 8, second embodiments of the fuel cell stack and the fuel cell device according to the present invention including the above-stated fuel cell units will be explained. FIG. 7 is a perspective view of a fuel cell stack according to the second embodiment of the present invention. FIG. 8 is a perspective view of a fuel cell device according to the second embodiment of the present invention.

As shown in FIG. 7, a fuel cell stack 70 has a plurality of fuel cell units 1 arranged laterally relative to the longitudinal direction A, and coupling members 72 for connecting the fuel cell units 1 adjacent to each other. Each of the coupling members 72 has two apertures 72a into which the tubular portions 24b, 26b of the fuel cell units 1 are respectively fitted, and a communicating passage 72b communicating with the two apertures 72a for communicating the connecting passages 24c, 26c of the tubular portions 24b, 26b with each other. The coupling members 72 are preferably made of conductive material.

As shown by arrows C2 in FIG. 7, in the fuel cell stack 70, all sixteen fuel cells 6 arranged in 4 rows×4 rows are electrically connected to each other in a series by coupling 72. No coupling members 72 are connected to the opposite terminals 6e, 6f of the fuel cells 6 electrically connected to each other in a series. References "a" and "b" shown in FIG. 7 are for indicating directions of the fuel cells 6; concretely, the reference "a" indicates the one end 6a while the reference "b" indicates the other end 6b.

As shown in FIG. 8, a fuel cell device 80, which is the second embodiment of the fuel cell device according to the present invention, has the above-stated fuel cell stack 70 and a case 82 enclosing the entire fuel cell stack 70. The case 82 preferably consists of a case body 82a having an opening on one side thereof, and a case plate 82b sealingly connected to the opening of the case body 82a. The case plate 82b has an input port 83a and an output port 83b through which gas acting on the inner electrode layer 16 flows, and the case body 82a has an input port 84a and an output port 84b through which gas acting on the outer electrode layer 20 flows. The input port 83a and the output port 83b are coupled to the respective terminals 6e, 6f, electrically connected thereto, and electrically insulated from each other. Further, these ports 62b, 63b, 64b, 64c are preferably connected to a recuperator (not shown).

Next, an operation of the above-stated fuel cell device will be explained.

Gas acting on the inner electrode layer 16 (fuel gas) is supplied to the input port 83a of the case plate 82b, passed through the fuel cell units 1 electrically connected to each other in a series, and discharged through the output port 83b. Further, gas acting on the outer electrode layer 20 (air) is supplied to the input port 84a of the case body 82a, passed around the outer electrode layer 20, and discharged through the output port 84b. Thus, the fuel cell units 1 are activated. Further, electricity at the inner electrode 16 is taken out via the sealer 32 and the inner electrode terminal 24, while electricity at the outer electrode 20 is taken out via the sealer 32 and the outer electrode terminal 26, and then the above-stated electricity is taken out through the input port 83a and the output port 83b of the case plate 82.

According to the fuel cell stack 70, the fuel cell device 80 can be easily extended laterally regardless of the electrical series and/or parallel connections of the fuel cells 6.

Figure 9:
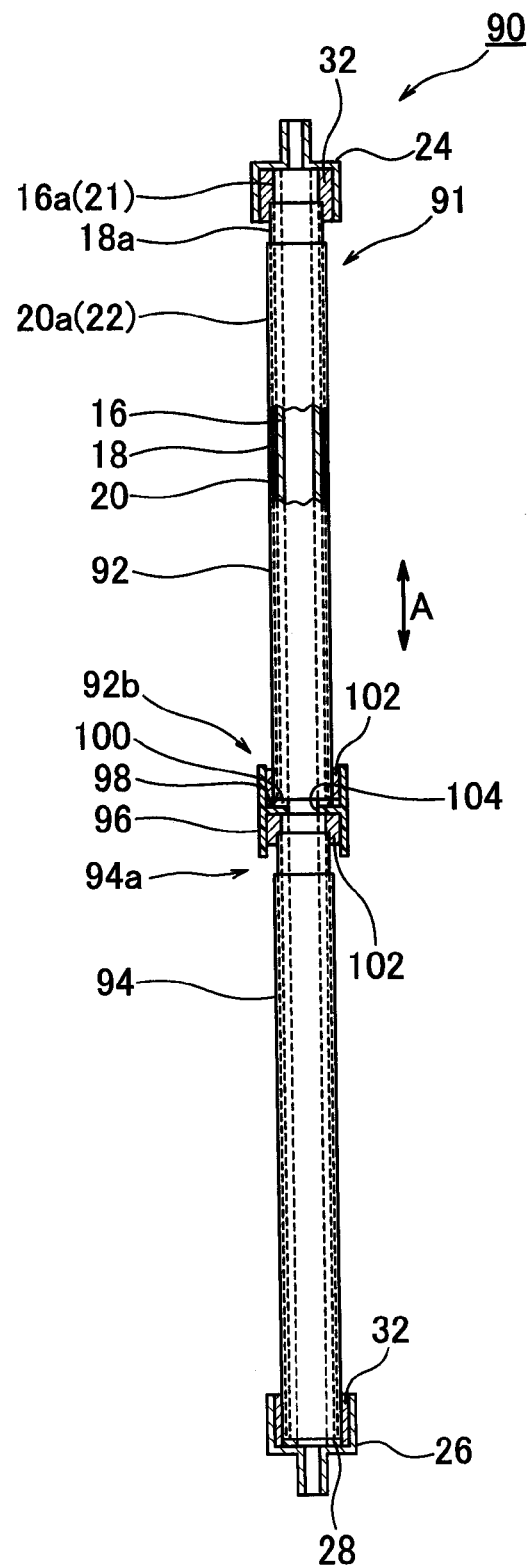
FIG. 9 is a cross-sectional view of a fuel cell unit according to a second embodiment of the present invention.

Next, referring to FIG. 9, a second embodiment of the fuel cell unit according to the present invention will be explained. FIG. 9 is a cross-sectional view of a fuel cell unit which is the second embodiment of the fuel cell unit according to the present invention. As shown in FIG. 9, a fuel cell unit 90 has a structure obtained by replacing one fuel cell (fuel cell body) 6 in the fuel cell unit 1 according to the first embodiment of the present invention as shown in FIG. 1 with a fuel cell body in which two fuel cells are coupled to each other in the longitudinal direction A and electrically connected to each other in a series, and which fuel cell body is a first embodiment of the fuel cell body according to the present invention Now, this fuel cell body 91 will be explained.

The fuel cell body 91, which is the fuel cell body according to the first embodiment of the present invention, has two fuel cells 92, 94 coupled to each other and electrically connected to each other in a series, and a coupling electrode terminal 96 coupling the other end 92b of the fuel cell 92 to the one end 94a of the fuel cell 94. Since each of the fuel cells 92, 94 has the same components as those in the fuel cell 6 in the fuel cell unit 1 according to the first embodiment of the present invention, the components of the fuel cells 92, 94 are indicated by the same reference numbers as those of the components in the fuel cell 6 and explanations of the former components are omitted. It should be noted that the other end 92b of the fuel cell 92 corresponds to the other end 6b of the fuel cell 6, and the one end 94a of the fuel cell 94 corresponds to the one end 6a of the fuel cell 6.

The coupling electrode terminal 96 is tubular and is disposed so that it covers the entire circumference of the outer electrode peripheral surface 22 of the other end 92b of the fuel cell 92 from the outside thereof and it is electrically connected thereto, as well as it covers the entire circumference of the inner electrode peripheral surface 21 of the one end 94a of the fuel cell 94 from the outside thereof and it is electrically connected thereto. The coupling electrode terminal 96 has an annular protrusion 98 in the middle thereof in the longitudinal direction A. The other end 92b of the fuel cell 92 abuts to the protrusion 98 via an insulating member 100 and the one end 94a of the fuel cell 94 also abuts to the protrusion 98. The coupling electrode terminal 96 is made of a conductive material, and gaps between the fuel cells 92, 94 and the coupling electrode terminal 96 are sealed with a conductive sealer 102, but a connecting passage is surely made for communicating the through passages 15 of the fuel cells 92, 94 with each other. Thus, the coupling electrode terminal 96 and the fuel cells 92, 94 electrically connected to each other via the coupling electrode terminal 96 are sealingly fixed with the conductive sealer 102 extending the entire circumferences of the fuel cells 92, 94. The coupling electrode terminal 96 is made of, for example, heat-resistant metal such as stainless steel, nickel base alloy or chromium base alloy, or ceramics such as lanthanum chromite. The sealer 102 is formed of silver, a mixture of silver and glass, or wax material including silver, gold, nickel, copper, and/or titanium.

Similar to the above-stated fuel cell unit 1, due to the coupling electrode terminal 96 in the fuel cell body 91, the fuel cells 6 can be easily assembled with each other in the longitudinal direction and electrically connected to each other in a series.

Figure 10:
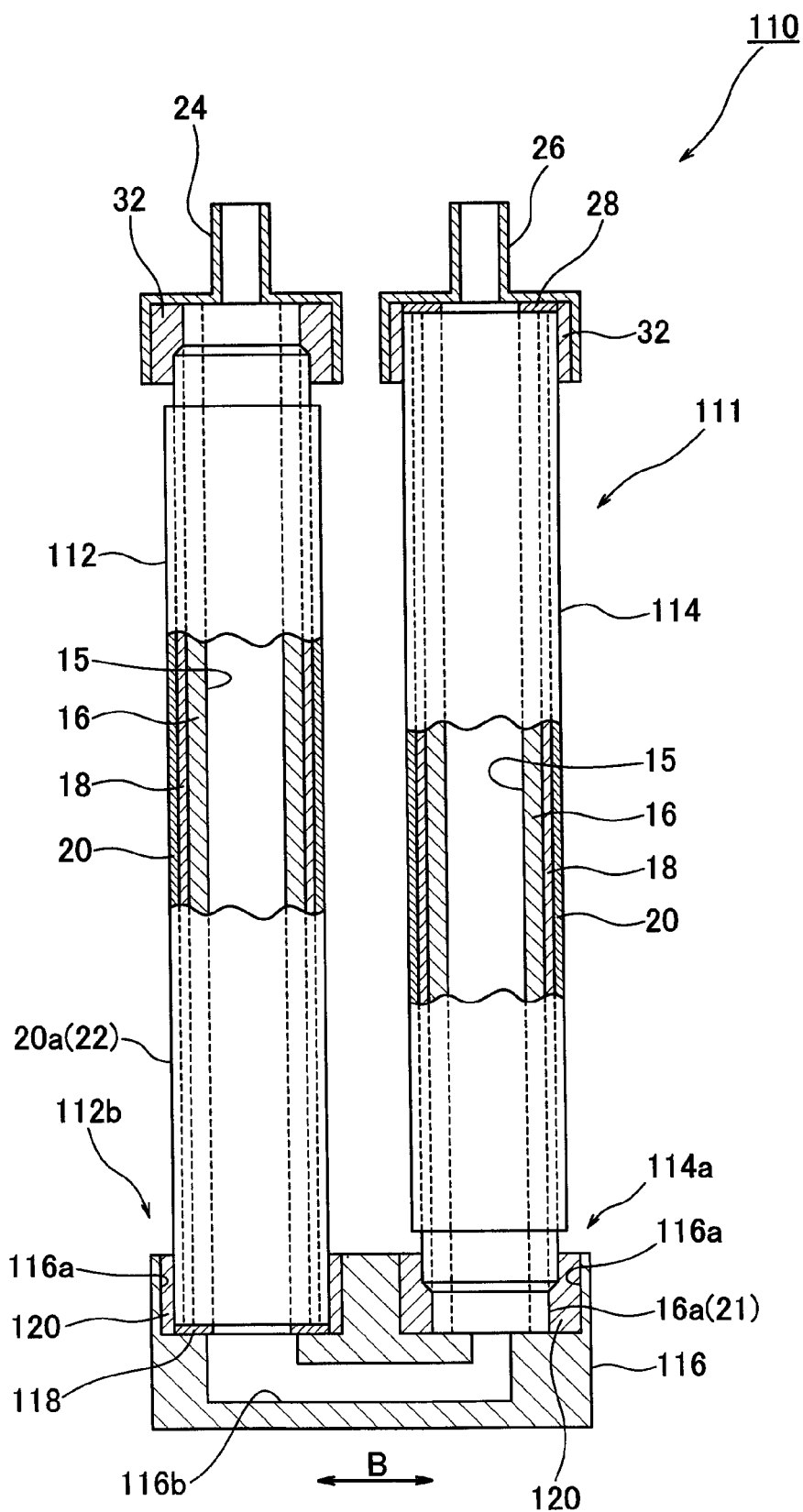
FIG. 10 is a cross-sectional view of a fuel cell unit according to a third embodiment of the present invention.
Figure 11:
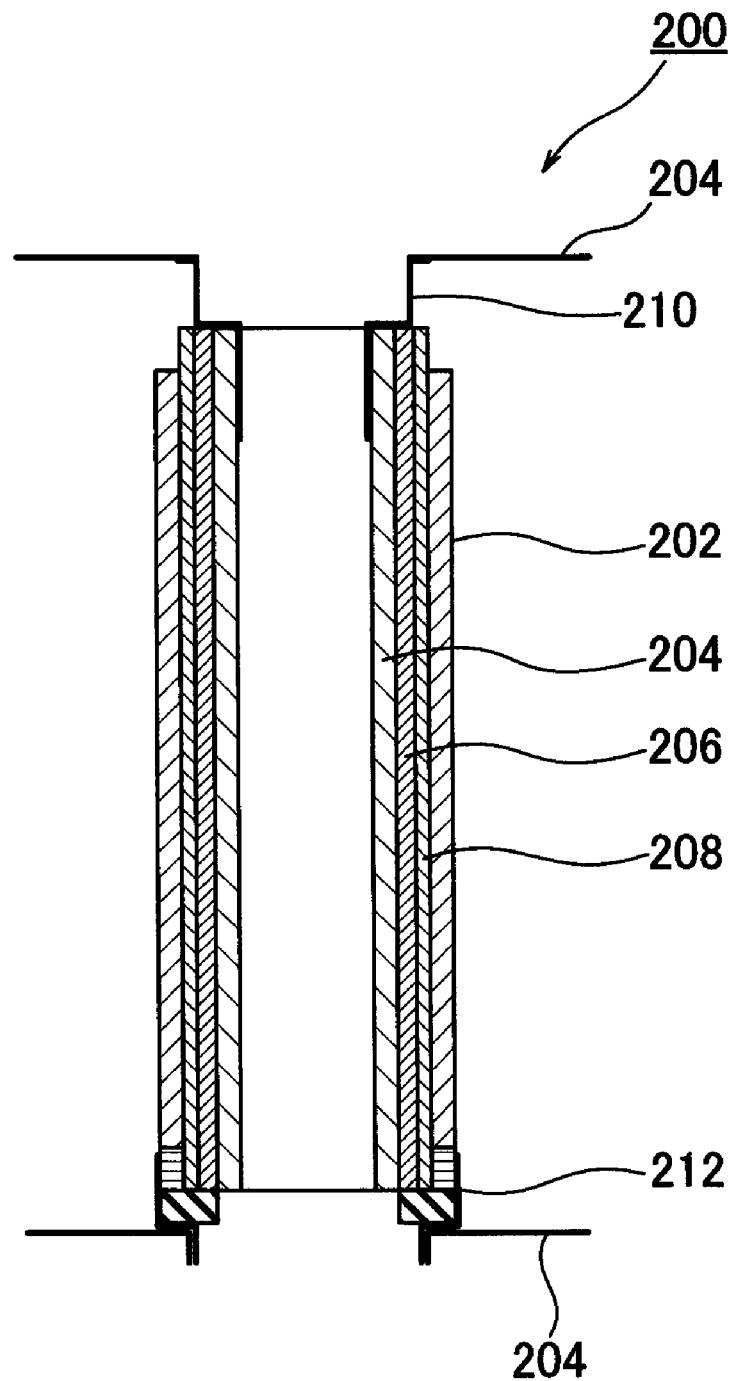
FIG. 11 is a schematically cross-sectional view of a fuel cell stack in prior art.

Next, referring to FIG. 10, a third embodiment of the fuel cell unit according to the present invention will be explained. FIG. 10 is a schematically cross-sectional view thereof. As shown in FIG. 10, a fuel cell unit 110 according to the third embodiment of the present invention has a structure similar to that of the fuel cell unit 1 according to the first embodiment of the present invention except that the one fuel cell (fuel cell body) 6 is replaced with a fuel cell body in which two fuel cells are arranged laterally relative to the longitudinal direction and electrically connected to each other in a series, and which fuel cell body is a second embodiment of the fuel cell body according to the present invention. Now, this fuel cell body 111 will be explained.

The fuel cell body 111 which is the second embodiment of the fuel cell body according to the present invention has two fuel cells 112, 114 arranged in a lateral direction B relative to the longitudinal direction and electrically connected to each other in a series, and a coupling electrode terminal 116 coupling the other end 112b of the fuel cell 112 to the one end 114a of the fuel cell 114. Since each of the fuel cells 112, 114 has the same components as those in the fuel cell 6 shown in FIG. 1, the components of the fuel cells 112, 114 are indicated by the same reference numbers as those of the components in the fuel cell 6 and explanations of the former components are omitted. It should be noted that the other end 112b of the fuel cell 112 corresponds to the other end 6b of the fuel cell 6, and the one end 114a of the fuel cell 114 corresponds to the one end 6a of the fuel cell 6.

The coupling electrode terminal 116 has two apertures 116a for respectively receiving the other end 112b of the fuel cell 112 and the one end 114a of the fuel cell 114, and a connecting passage 116b communicating the two apertures 116a with each other for communicating the through passages 15 of the fuel cells 112, 114 with each other. Further, the coupling electrode terminal 116 is disposed so that it covers the entire circumference of the outer electrode peripheral surface 22 of the other end 112b of the fuel cell 112 from the outside thereof and it is electrically connected thereto, as well as it covers the entire circumference of the inner electrode peripheral surface 21 of the one end 114a of the fuel cell 114 from the outside thereof and it is electrically connected thereto, and thus the outer electrode peripheral surface 22 of the fuel cell 112 are electrically connected to the inner electrode peripheral surface 21 of the fuel cell 114. The other end 112b of the fuel cell 112 abuts to the aperture 116a via an insulating member 118, and the one end of the fuel cell 114 abuts to the aperture 116a. The coupling electrode terminal 116 and the fuel cells 112, 114 electrically connected to each other via the coupling electrode terminal 116 are sealingly fixed to each other with a conductive sealer 120 extending over the entire circumferences of the fuel cells 112, 114. The coupling electrode terminal 116 is made of, for example, heat-resistant metal such as stainless steel, nickel base alloy or chromium base alloy, or ceramics such as lanthanum chromite. The sealer 120 is formed of silver, a mixture of silver and glass, or wax material including silver, gold, nickel, copper, or titanium.

Similar to the above-stated fuel cell unit 1, due to the coupling electrode terminal 116 in the fuel cell body 111, the fuel cells 6 can be easily assembled with each other laterally and electrically connected to each other in parallel and/or in a series.

Further, in the fuel cell body 111, the conductive sealer 120 has a function of dividing gas acting on the inner electrode layer 18 from gas acting on the outer electrode layer 20, and a function of taking out electricity from the inner and outer electrode layers 18, 20. Further, since the conductive sealer 120 has a good sealing adhesion relative to the inner electrode peripheral surface 21, contact resistance at an interface of the sealer 120 can be reduced so that a fuel cell body 111 having a good performance of electric power generation and good reliability can be provided. Thus, the fuel cell device can be easily assembled.

The embodiments of the present invention has been explained, but the present invention is not limited to the above-mentioned embodiments and it is apparent that the embodiments can be changed within the scope of the present invention set forth in the claims.

In the above-stated fuel cell stacks 50, 70 which are respectively the first and second embodiments of the fuel cell stack according to the present invention, although twenty and sixteen fuel cells 6 are electrically connected to each other in a series, the number of the fuel cells 6 connected to each other is arbitrary. Further, in the fuel cell stack 70, although the coupling member 72 connects the two fuel cell units 1 to each other, the number of the fuel cell units 1 connected to each other by means of the coupling member 72 may be more than two. In such a case, the fuel cell stack 70 may include fuel cell units 1 electrically connected to each other in parallel.

Further, in the above-stated embodiments, the fuel cell 6 is a cylindrical tube with a circular cross section, but it may be another cross-sectional form as long as it is tubular. Concretely, the fuel cell may be in a flat-tube form having an oblong or oval cross section or in a polyangular-tube form having a polyangular section.

Further, the fuel cell body, the fuel cell unit and the fuel cell stack according to the present invention can appropriately be combined to form a fuel cell device.

What is claimed is:

1. A fuel cell unit incorporated in a fuel cell device comprising:
    a tubular fuel cell body having a tubular inner electrode layer, a tubular outer electrode layer, a tubular electrolyte layer disposed between the inner and outer electrode layers, and a through passage formed inside of the inner electrode layer;
    an inner electrode terminal fixed at one end of the fuel cell body configured to take out electricity from the inner electrode layer; and
    an outer electrode terminal fixed at the other end of the fuel cell body configured to take out electricity from the outer electrode layer;
    wherein the fuel cell body has, at the one end thereof, an inner electrode exposed periphery where the inner electrode layer is exposed and extends further in a longitudinal direction than the electrolyte layer and the outer electrode layer;
    wherein the fuel cell body has, on a peripheral surface at the one end thereof, an inner electrode peripheral surface electrically communicating with the inner electrode layer via the inner electrode exposed periphery, and, on a peripheral surface at the other end thereof, an outer electrode peripheral surface electrically communicating with the outer electrode layer;
    wherein the inner electrode terminal has a cylindrical body portion disposed so that it covers over the entire circumference of the inner electrode peripheral surface from the outside thereof and it is electrically connected thereto, and a cylindrical tubular portion extending from the body portion in a direction away from the fuel cell body in the longitudinal direction, a diameter of the tubular portion of the inner electrode terminal being smaller than a diameter of the body portion of the inner electrode terminal;
    wherein the outer electrode terminal has a cylindrical body portion disposed so that it covers the entire circumference of the outer electrode peripheral surface from the outside thereof and it is electrically connected thereto, and a cylindrical tubular portion extending from the body portion in a direction away from the fuel cell body in the longitudinal direction, a diameter of the tubular portion of the outer electrode terminal being smaller than a diameter of the body portion of the outer electrode terminal; and
    wherein the inner electrode terminal and the outer electrode terminal have respective connecting passages which are communicated with the through passage and the exterior of the fuel cell body.

2. The fuel cell unit according to claim 1, wherein the inner electrode terminal and the fuel cell body are sealingly fixed to each other with a conductive sealer extending over the entire circumferences thereof, and the outer electrode terminal and the fuel cell are sealingly fixed to each other with a conductive sealer extending over the entire circumferences thereof.

3. The fuel cell unit according to claim 1,
    wherein cross-sectional outer profiles of the tubular portions of the inner electrode terminal and the outer electrode terminal are identical to each other.

4. The fuel cell unit according to claim 1, wherein the fuel cell body is defined by one fuel cell or a plurality of fuel cells longitudinally coupled to each other and electrically connected to each other in a series.

5. The fuel cell unit according to claim 1, wherein the inner electrode peripheral surface is defined by the inner electrode exposed periphery.

6. The fuel cell unit according to claim 1, wherein the outer electrode peripheral surface is defined by the outer electrode layer.

7. The fuel cell unit according to claim 1, the fuel cell body further has an outer electrode collecting layer disposed outside of the outer electrode layer, wherein the outer electrode peripheral surface is defined by the outer electrode collecting layer.

8. A fuel cell device comprising the fuel cell unit according to claim 1.

9. The fuel cell unit according to claim 2,
wherein cross-sectional outer profiles of the tubular portions of the inner electrode terminal and the outer electrode terminal are identical to each other.

10. The fuel cell unit according to claim 2, wherein the fuel cell body is defined by one fuel cell or a plurality of fuel cells longitudinally coupled to each other and electrically connected to each other in a series.

11. The fuel cell unit according to claim 2, wherein the inner electrode peripheral surface is defined by the inner electrode exposed periphery.

12. The fuel cell unit according to claim 2, wherein the outer electrode peripheral surface is defined by the outer electrode layer.

13. The fuel cell unit according to claim 2, the fuel cell body further has an outer electrode collecting layer disposed outside of the outer electrode layer, wherein the outer electrode peripheral surface is defined by the outer electrode collecting layer.

14. A fuel cell device comprising the fuel cell unit according to claim 2.

15. A fuel cell stack comprising:
a plurality of the fuel cell units set forth in claim 3 and arranged laterally relative to the longitudinal direction; and
support plates which have respective apertures fitted to the tubular portions of the plurality of the fuel cell units and which are positioned at the respective opposed ends thereof.

16. A fuel cell stack comprising:
a plurality of the fuel cell units set forth in claim 3 and arranged laterally relative to the longitudinal direction; and
a coupling member fitted to the tubular portions of the at least two adjacent fuel cell units and coupling them to each other;
wherein the coupling member has a connecting passage connecting the connecting passages in the tubular portions of the adjacent fuel cell units to each other.

17. A fuel cell device comprising the fuel cell stack according to claim 15.

18. A fuel cell device comprising the fuel cell stack according to claim 16.

19. A fuel cell stack comprising:
a plurality of the fuel cell units set forth in claim 9 and arranged laterally relative to the longitudinal direction; and
support plates which have respective apertures fitted to the tubular portions of the plurality of the fuel cell units and which are positioned at the respective opposed ends thereof.

20. A fuel cell stack comprising:
a plurality of the fuel cell units set forth in claim 9 and arranged laterally relative to the longitudinal direction; and
a coupling member fitted to the tubular portions of the at least two adjacent fuel cell units and coupling them to each other;
wherein the coupling member has a connecting passage connecting the connecting passages of the tubular portions of the adjacent fuel cell units to each other.

21. A fuel cell device comprising the fuel cell stack according to claim 19.

22. A fuel cell device comprising the fuel cell stack according to claim 20.

* * * * *